Sept. 26, 1967  E. L. ADAMS  3,343,212
ELASTIC MELT EXTRUDER FOR EXTRUDING THERMOPLASTICS
Filed June 11, 1964

INVENTOR.
ELMER L. ADAMS DECEASED
by WANDA J. ADAMS EXECUTRIX
BY
*Spencer L. Blaylock*
*W. A. Schach*
ATTORNEYS

United States Patent Office 3,343,212
Patented Sept. 26, 1967

3,343,212
ELASTIC MELT EXTRUDER FOR EXTRUDING THERMOPLASTICS
Elmer L. Adams, deceased, late of Toledo, Ohio, by Wanda J. Adams, executrix, Toledo, Ohio, assignor to Owens-Illinois, Inc., a corporation of Ohio
Filed June 11, 1964, Ser. No. 374,545
7 Claims. (Cl. 18—12)

ABSTRACT OF THE DISCLOSURE

An elastic melt extruder in which a melt chamber having a fixed face surrounding a central outlet orifice is provided with a movable circular disc spaced from the fixed face through a melt gap, structure for rotating the disc about its own axis, and further structure for displacing the disc about a second and different axis. As a result of the compound movement of the disc, material is moved through the melt gap in a spiral path substantially different from the normal centripetal movement of the material.

---

The present invention relates to an elastic melt extruder, and more particularly to such an extruder wherein a rotatable disc is supported for compound rotation about a pair of separate axes to provide an improved plasticizing effect at a melt gap partially defined by the rotatable plate.

An elastic melt extruder utilizes a power driven rotatable disc operable within a cylindrical chamber provided with an inlet to which solid plastic material is furnished. A radial face of the disc is spaced in confronting relation with and through a narrow melt gap from the corresponding face of an orifice plate having an exit orifice axially aligned with the disc. As the disc is rotated, the thermoplastic material which is introduced in solid form peripherally of the disc, is confined between the radial faces of the disc and the orifice plate, so as to be subjected to shearing forces. The thermoplastic material is essentially elastic, and the tendency of the sheared material for elastic recovery after arcuate shearing and stretching between the radial faces effects centripetal flow of material between the discs and the orifice plate toward the central orifice, the material issuing from the orifice in plasticized condition at a predetermined pressure.

One common defect in such extruders is the difficulty of maintaining accurate and rapid introduction of solid plasticized material into the melt chamber. The simplest feeding method, of course, is merely allowing the solid material to gravitationally fall into a tangential inlet opening. Such feeding is non-positive, irregular and requires the utilization of uniformly sized or "pelletized" material. The utilization of a power driven feed screw has recently been proposed. This power feed system works well, although considerable additional apparatus, driving mechanism and the like are required.

The present invention now proposes a basic improvement in such a conventional elastic melt extruder by imparting a compound rotational movement to the disc or plate which is movable in the melt chamber. More particularly, the present invention proposes rotating the disc about its own axis and simultaneously rotationally displacing the disc axis about a second and different axis to thereby shift the location of the disc in the melt chamber.

The disc is thus bodily shifted or displaced relative to the fixed chamber and the fixed wall of the chamber which cooperates with the disc to determine the melt gap therebetween. This displacement of the disc bodily in the chamber yields several advantages, since material in the melt chamber is agitated, material tending to cling to the melt chamber walls can be scraped therefrom by the disc, the feed efficiency can be increased, and material can be moved through the gap in a compound spiral path substantially differing from the conventional spiral "normal force" path. This compound spiral path of material through the gap can be utilized to effect movement of the thermoplastic material by virtue of the disc displacement, as well as by virtue of the Weissenberg effect or the normal force effect normally obtained in elastic melt extruders. The two effects can be additive (thereby moving material through the melt gap more quickly) or subtractive (thereby moving material through the melt gap more slowly). Additive movement increases the extruder output; subtractive movement increases the amount of material residence time for greater mixing and greater plasticizing action.

It is, therefore, an important object of the present invention to provide a new and improved plasticizer-extruder of the elastic melt type and having a rotatable disc at least partially defining a melt gap, the disc being bodily displaceable to shift the location of the melt gap.

Another important object of the present invention is the provision of an elastic melt extruder wherein thermoplastic material moving through a melt gap is moved in a compound spiral path resulting from the normal force effects and also from the displacement of one of the elements defining the gap.

It is a further important object of this invention to provide an improved method of plasticizing and extruding thermoplastic material by advancing such material through a melt gap in a spiral path resulting (1) from the normal force effect exerted at the gap and (2) from shifting the gap rotationally.

Yet another, and no less important, object of the present invention resides in the provision of an elastic melt extruder in which a conventionally rotatable disc is displaced rotationally about an axis which is separate and distinct from the disc axis of rotation to vary the feed efficiency, the output capacity and the material residence time of the extruder.

Other objects of this invention will appear in the following description and appended claims, reference being had to the accompanying drawings forming a part of this specification wherein like reference characters designate corresponding parts in the several views.

Figure 1:
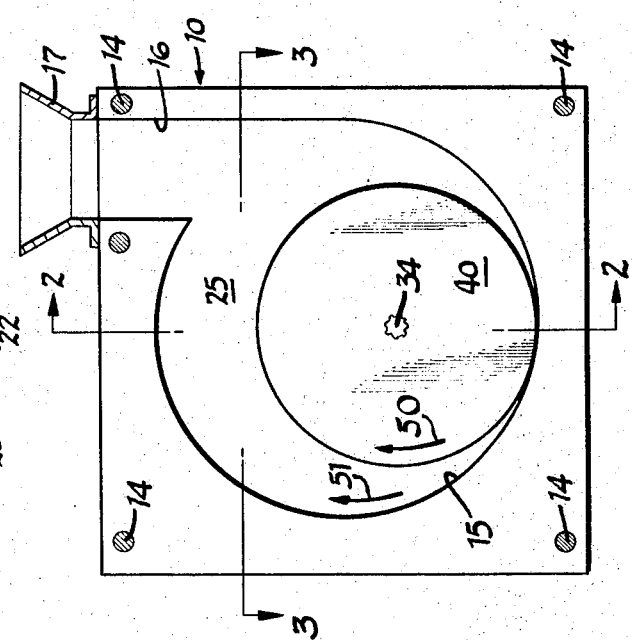
FIGURE 1 is a front elevational view of a plasticizer-extruder of the present invention, capable of carrying out the method of the present invention, FIGURE 1 being taken with the plasticizer-extruder cover-plate removed.

In FIGURE 1 the reference numeral 10 indicates generally a plasticizer-extruder of the present invention, such extruders being variously referred to as "elastic melt extruders" or "visco-elastic extruders." The extruder 10 comprises generally a fixed rear casing element 11, a front casing element 12 and an intermediate or spacer element 13 which are secured together by suitable means, as by bolts 14, to define a complete casing. The central casing element 13 is provided with an essentially cylindrical bore 15 communicating with a tangential inlet opening 16 communicating freely at its upper end with a supply hopper 17. The front casing portion 12 is provided with a planar interior wall or surface 20 surrounding a central outlet opening 21 within which is positioned an orifice tube 22 surrounding an outlet orifice 23.

The bore 15 surrounds and peripherally encloses an interior melt chamber indicated generally at 25 which is adapted to receive solid, thermoplastic material from the overlying hopper 17 through the peripheral inlet 16.

The rear casing portion 11 is provided with a recess 26 opening onto the chamber 25, ingress to the recess 26 being provided by an aperture 23 in which is positioned a cylindrical bearing 28 journalling a drive shaft 30 adapted to be rotated by suitable drive mechanism such as an electric motor, hydraulic motor or the like.

Carried by that end of the shaft 30 projecting into the recess 26 is a crank arm 31 projecting radially of the shaft and provided with an antifriction bearing indicated generally at 32, the inner race 33 of which is splined or otherwise non-rotatably connected to a driven shaft 34.

This driven shaft 34 is preferably permanently magnetized and is surrounded by a fixed armature coil 35 enclosed within a motor housing 36. The armature 35 receives electric current through electrical lead lines 37, the armature 35 and the housing 36 being permanently fixed to the crank arm 31 which, in turn, is permanently fixed to the shaft 30. Thus, the leads 37 are not subjected to any rotational force. The lead lines 37 are attached to a suitable source of electric current, so that the winding 35, when energized electrically, and the permanently magnetized shaft 34 form an electric motor capable of rotating the shaft 34.

Figure 4:
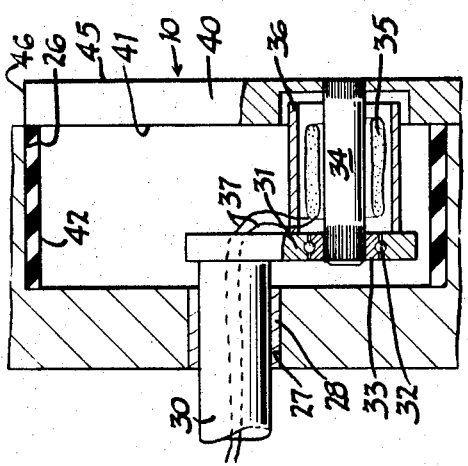
FIGURE 4 is a fragmentary enlarged sectional view of FIGURE 3.
Figure 2:
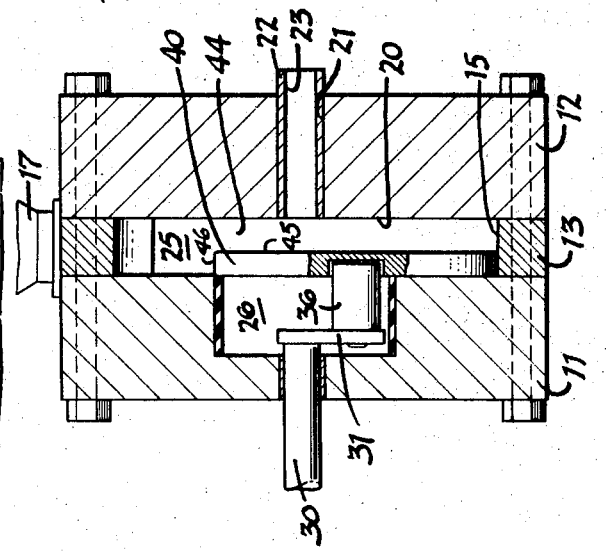
FIGURE 2 is a sectional view taken along the plane 2—2 of FIGURE 1.
Figure 3:
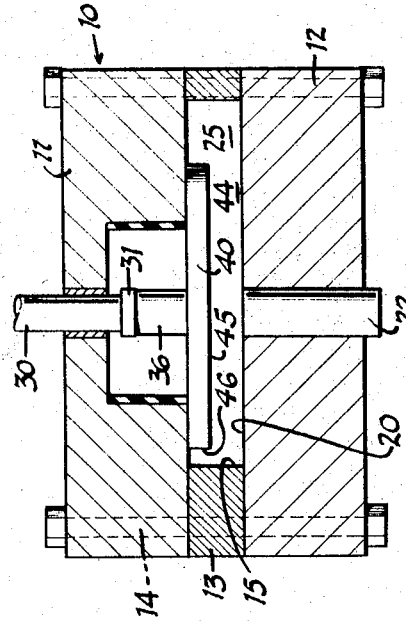
FIGURE 3 is a sectional view taken along the plane 3—3 of FIGURE 1.

The free righthand end of the shaft 34 (as viewed in FIGURES 3 and 4) is keyed or otherwise rigidly attached to a rotatable disc 40.

This disc 40 is of a diameter sufficient to cover the open righthand end of the recess 26, the rear surface 41 of the disc 40 contacting an edge seal 42 extending peripherally of the recess 26.

Thus, it will be seen that the disc 40 is rotatable about its own axis by means of the electric motor provided by the armature 35 and the shaft 34, and the shaft 40 also is rotated about an axis removed from its own axis, i.e., the axis of the shaft 30, by means of the crank arm 31 and the shaft 30. The front, or righthand face 45 of the rotatable disc 40 is spaced from the face 20 through a melt gap, indicated generally at 44, and of a dimension such that thermoplastic material interposed therebetween will be subject to the normal force effect exerted upon relative rotation of the surfaces 45 and 20.

Solid plastic material introduced from the hopper 17 through the passage 16 and into the chamber 25 will be subjected to the normal force effect or the Weissenberg effect exerted at the gap 40. The compound rotation of the plate 40 will shift the location of this gap peripherally of the essentially circular chamber 25. Further, the peripheral edge 46 of the plate 40 is in close proximity to the surrounding peripheral wall provided by the bore 15, the location of such proximity constantly shifting as the plate 40 is rotated about the two axes. This rotation of the plate takes place in a clockwise direction about both axes (as viewed in FIGURE 1), rotation about the axis 34 taking place in a direction indicated by the directional arrow 50, and rotation about the shaft 30 taking place in a direction indicated by the directional arrow 51.

Analysis of these two components of movement of any point upon the face 45 of the disc 40 will indicate that such a point moves in a compound spiral path toward the axis of the chamber 25 and toward the outlet orifice 23 when rotation about the two axes is in the same direction. Such compound spiral movement is in addition to and independent of the movement of the thermoplastic material through the melt gap 44 toward the outlet orifice 23 due to the normal force effect. By selection of the relative speeds of rotation of the plate or disc 40 about its own axis (in the direction 50) and about the axis remote from the plate axis (in the direction 51), this spiral path can be varied to yield the most desirable results. For example, movement toward the orifice 23 can be speeded up by increasing the speed of rotation of the plate about its own axis (in the direction 50). If the disc 40 were rotated in a counterclockwise direction while the shaft 30 were rotated clockwise, a subtractive compound motion would take place. Thus, by varying the relative directions and speeds of rotation, different compound spiral paths can be obtained.

Of course, the disc 40 is rotated about the axis of the shaft 30, the location of the melt gap 40 shifts relative to the fixed surface 20, the melt gap completely traversing the surface 20 upon one rotation of the plate about the axis of the shaft 30. This shifting of the melt gap insures the subjection of all the plasticized material in the chamber 25 to the gap and aids in insuring the subjection of all the material to the normal force effect.

Further, the clockwise rotation of the plate in the directions 50 and 51, and the orientation of the tangential inlet 16, are such that movement of the plate adjacent the inlet 16 aids in feeding solid thermoplastic material into the chamber 25 and eventually into the melt gap 44.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. In an elastic melt extruder, means enclosing an interior cylindrical melt chamber having a peripheral inlet and an axial outlet, one radial wall of said chamber defining a fixed face concentric with said outlet, a movable circular disc having a radial wall spaced axially from said fixed face through a melt gap, means for rotating said disc about its own axis, and means for bodily displacing said disc about an axis displaced from its own axis and coinciding with the axis of said chamber.

2. In an apparatus for plasticizing thermoplastic material by the Weissenberg effect, means for introducing solid plasticized material into an essentially cylindrical melt chamber having a planar fixed wall surrounding a central outlet orifice, means for rotating a circular disc about its own axis to define a visco-elastic melt gap between an end face of said disc and the chamber fixed wall, said melt gap being substantially smaller in radial extent than said chamber, and means for bodily displacing said disc about a second and different axis to vary the location of said melt gap in said chamber.

3. In an apparatus for plasticizing thermoplastic material in an elastic melt extruder wherein a rotary plate rotated about its own central axis in spaced relation to a fixed plate normally centripetally moves plasticized material through a melt gap defined between the plates for issuance through an orifice located centrally of the gap, the improvement of means for rotationally displacing the rotary plate about a second axis different from the central axis of said rotary plate to advance material through said gap in a spiral path substantially different from said normal centripetal movement of said material.

4. In an elastic melt extruder, a casing enclosing an interior melt chamber circumscribed by a cylindrical wall provided with a peripheral inlet opening, said chamber having a circular end wall provided with a central outlet orifice aligned with the chamber axis, a movable circular disc disposed in said chamber and of a diameter substantially less than the diameter of said cylindrical chamber wall, means for bodily displacing said disc about a primary axis axially aligned with the axis of said chamber, and means for rotating said disc about a secondary axis radially displaced from said primary axis.

5. In an elastic melt extruder, means enclosing an interior cylindrical melt chamber having a peripheral inlet and an axial outlet, one radial wall of said chamber defining a fixed face surrounding said outlet, a movable circular plate having a radial wall spaced from said fixed face through a melt gap, means for rotating said plate about its own axis, and means for driving said plate about an axis displaced from its own axis and coinciding with the axis of said outlet, the compound motion of said plate (1) exerting a Weissenberg effect on material in said gap, (2) agitating material in said melt chamber, (3) wiping material from the melt chamber walls and (4) moving material through said gap in a compound spiral path.

6. In an elastic melt extruder, a casing enclosing an interior melt chamber circumscribed by a cylindrical wall provided with a peripheral inlet opening, said chamber having a circular end wall provided with a central outlet orifice aligned with the chamber axis, a movable circular disc disposed in said chamber and of a diameter substantially less than the diameter of said cylindrical chamber wall, a crankshaft rotatable about a primary axis axially aligned with the axis of said chamber and having an offset crank arm on which said disc is rotatable, the offset of said crank arm being no more than one-half the difference in diameter between said chamber and said disc, and means for rotating said disc on said offset crank arm.

7. In an apparatus for plasticizing thermoplastic material in an elastic melt extruder wherein a rotary plate rotated about its own central axis in spaced relation to a fixed plate normally centripetally moves plasticized material through a melt gap defined between the plates for issuance through an orifice located in the fixed plate centrally of the gap, the improvements of drive means for imparting to the rotary plate an additional rotary motion about a second axis different from the central axis of said rotary plate, whereby material is advanced through said gap in a spiral path resulting from the compounded dual rotation of said plate about both said axes.

References Cited

UNITED STATES PATENTS

| | | | |
|---|---|---|---|
| 3,046,603 | 7/1962 | Maxwell | 18—12 |
| 3,079,635 | 3/1963 | Adams | 264—176 |
| 3,082,476 | 3/1963 | Bunch | 264—176 |
| 3,137,034 | 6/1964 | Adams | 18—12 |

ROBERT F. WHITE, *Primary Examiner.*

G. AUVILLE, *Assistant Examiner.*